May 9, 1950 G. M. MAGRUM 2,506,725
BELLOWS CONSTRUCTION
Filed Dec. 22, 1945 4 Sheets-Sheet 1
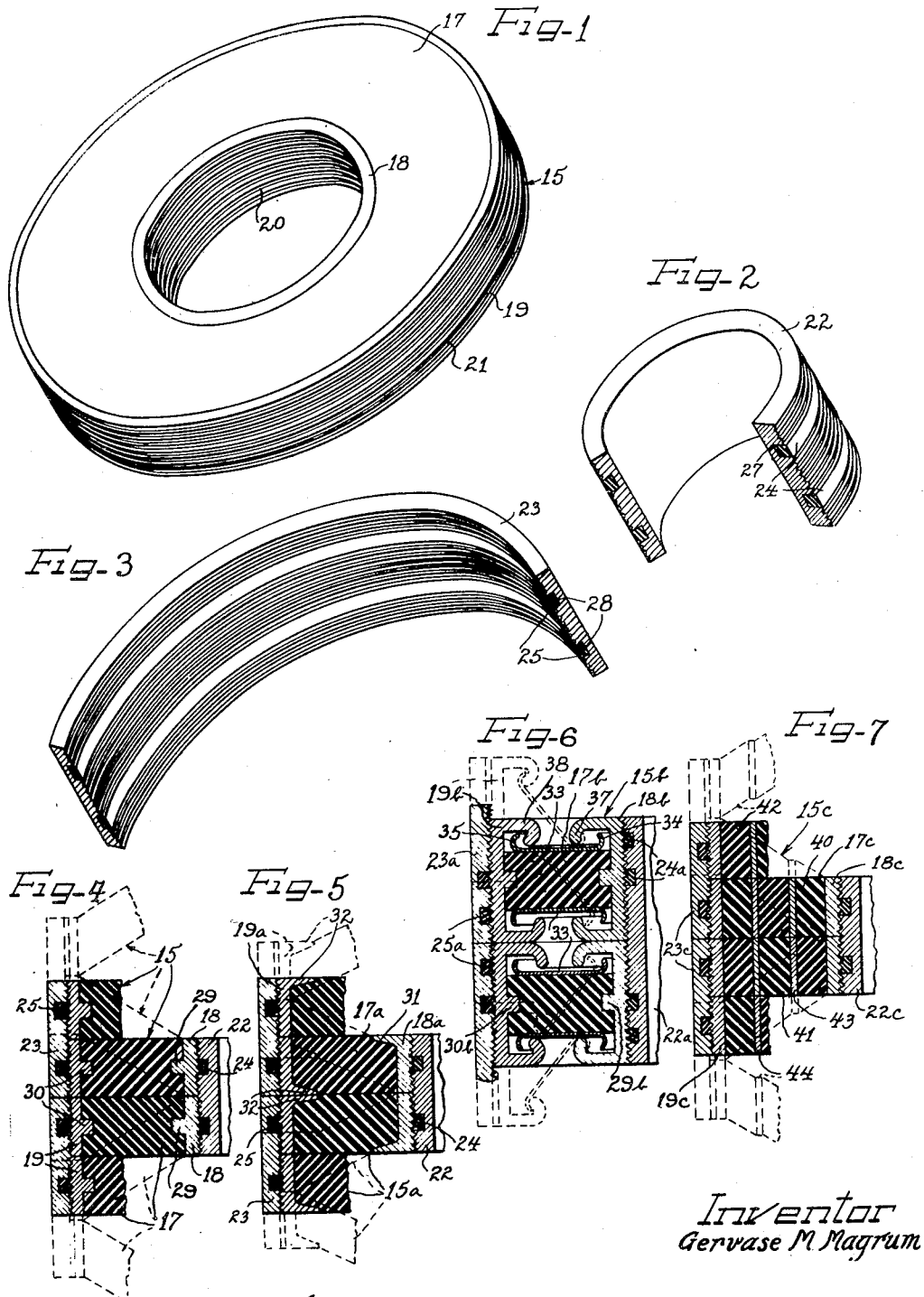
Inventor
Gervase M. Magrum

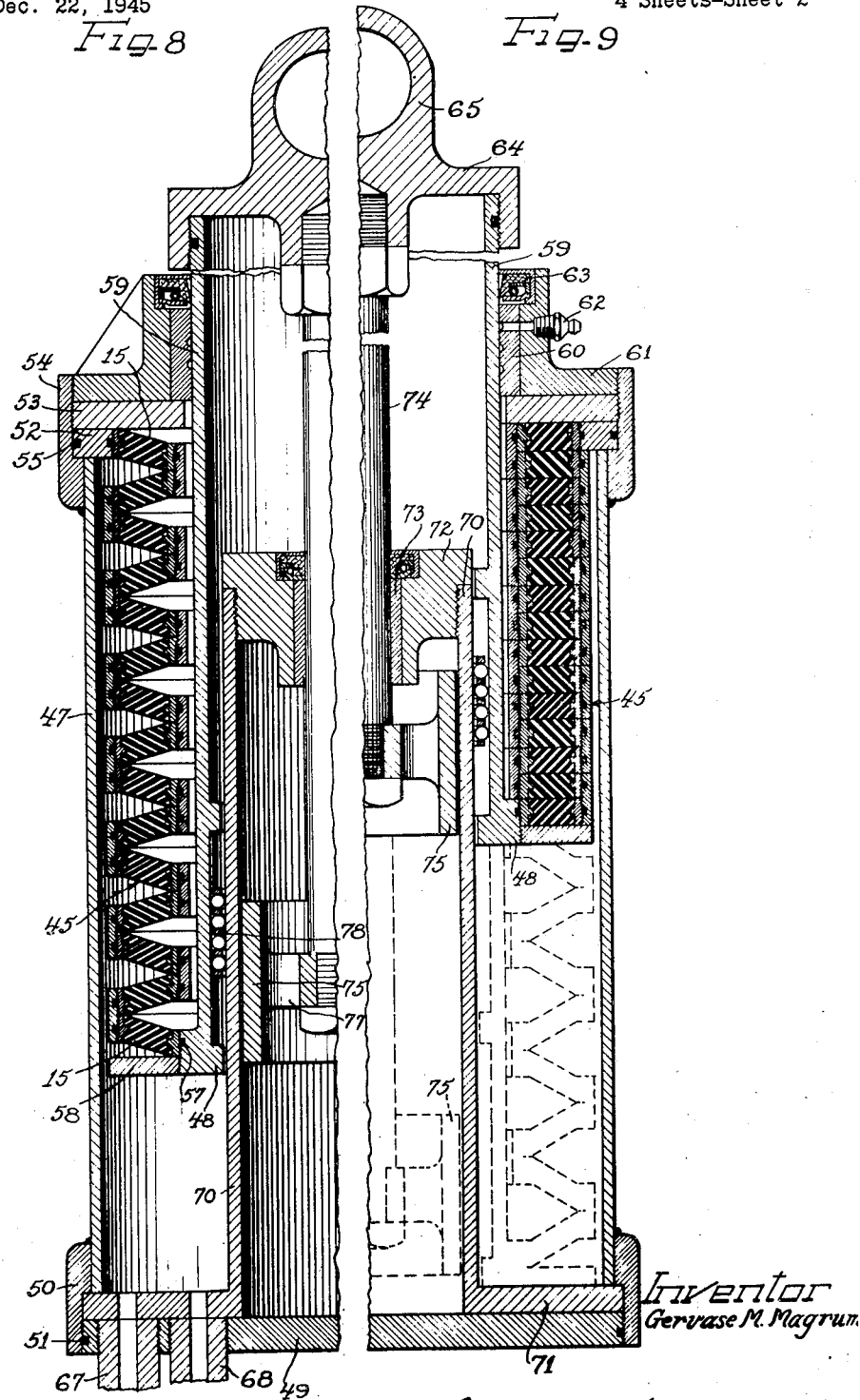

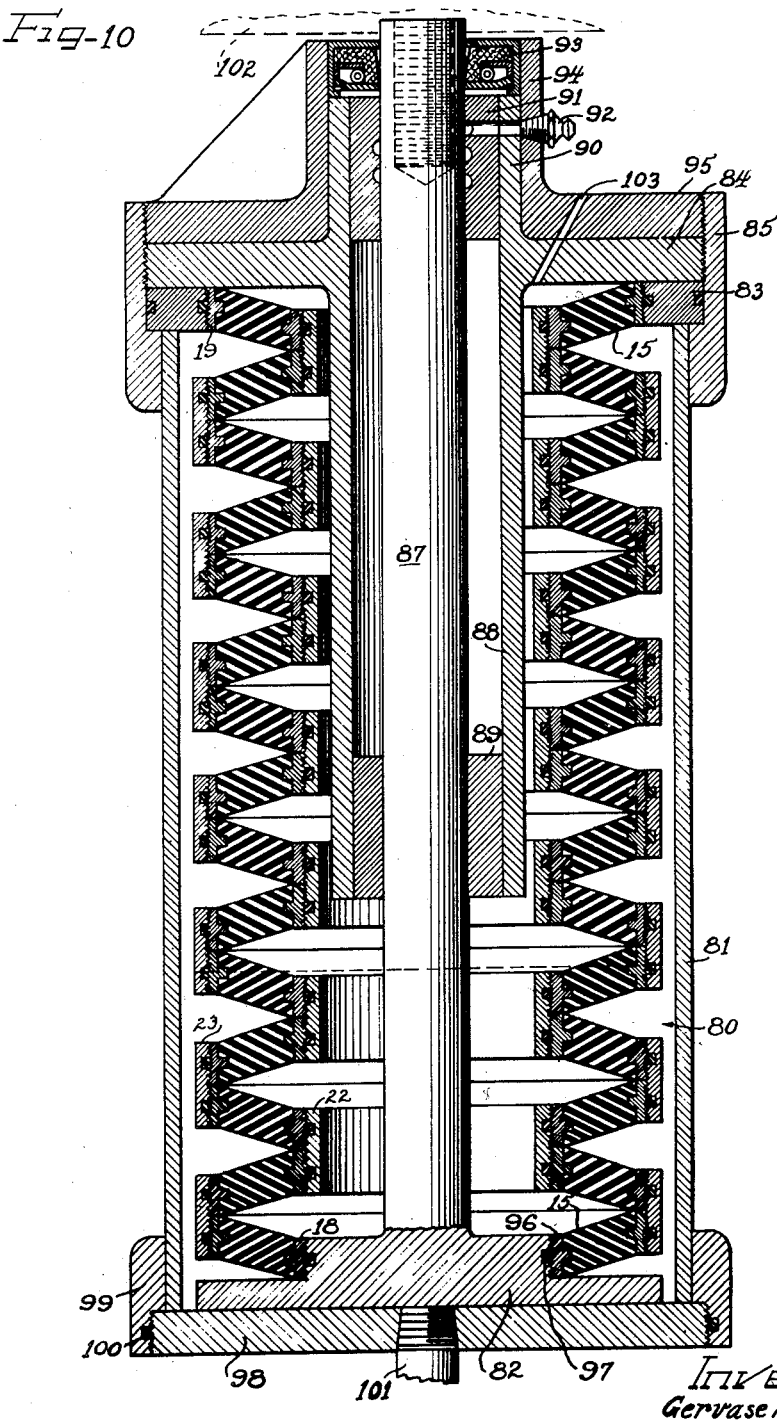

May 9, 1950     G. M. MAGRUM     2,506,725
BELLOWS CONSTRUCTION

Filed Dec. 22, 1945     4 Sheets-Sheet 4

Inventor
Gervase M. Magrum

Patented May 9, 1950

2,506,725

UNITED STATES PATENT OFFICE 2,506,725

BELLOWS CONSTRUCTION

Gervase M. Magrum, Buffalo, N. Y., assignor to Houdaille-Hershey Corporation, Detroit, Mich., a corporation of Michigan Application December 22, 1945, Serial No. 636,666

16 Claims. (Cl. 137—156.5)

This invention relates to a new and improved bellows construction, and more especially concerns bellows for use as sealing means with reciprocating mechanisms involving pistons operating under high pressure conditions.

While it has long been recognized that bellows-type seals between relatively reciprocable elements have certain inherent advantages in the attainment of positive and absolutely leakproof sealing, there have also been definite and serious limitations as to capability, performance and endurance in prior bellows constructions. Limitations upon usefulness of prior bellows have been especially marked where high fluid pressures are involved in the operation of the bellows, and the range of usefulness of bellows sealing structures is even further limited where in addition to high fluid pressure, long range reciprocal movement between the parts is involved.

A principal object of the present invention is to provide a new and improved bellows construction which is especially adapted for high pressure operating conditions.

Another object of the invention is to provide a bellows structure which will permit large axial deflections with a minimum number of convolutions.

Still another object of the invention is to provide a bellows structure which is capable of enduring an exceedingly large number of operative axial deflection movements throughout a full compression and extension range.

Yet another object of the invention is to provide a bellows structure especially adapted for use with a reciprocable piston and having improved means for sealing the opposite ends of the bellows against leakage even under conditions of high fluid pressure.

A further object of the invention is to provide a new and improved bellows structure which is unusually adaptable to deflection for misalignment and eccentricity in the reciprocable parts of the apparatus in which the bellows is used.

A still further object of the invention is to provide a novel bellows structure which will afford a substantial latitude in the spring effect or resiliency thereof, and which is especially adaptable for conditions of use where a relatively low resilience but high pressure resistance is desirable.

Another and further object of the invention is to provide a bellows construction in which any desired varied bellows lengths can be built up from standardized units.

An additional object is to provide a bellows construction in which the convolutions are made up from readily replaceable units.

It is another object of the invention to provide a new and improved bellows structure which is of such efficiency, pressure resistance, and high deflection properties that it can replace the usual packing employed in effecting the seal between a piston and its cylinder wall, thus avoiding any contact between the piston and the cylinder and overcoming conditions of misalignment and wear.

It is also an object of the invention to provide a new and improved bellows construction in which the diaphragm elements which constitute the convolutions of the bellows are capable of unusually long life and freedom from fatigue failures.

Another object is to provide a bellows structure which embodies and makes use of the advantages of both metal and material on the order of rubber.

A further object is to provide a novel bellows structure in which the convolutions are formed from a highly yieldable material which is protectively armored against undesirable or damaging pressures, friction, and other deleterious or detrimental conditions.

Other objects, features and advantages of the invention will be readily apparent from the following detailed description of certain preferred embodiments thereof taken in conjunction with the accompanying four sheets of drawings, in which:

Figure 1 is an isometric view of an annular diaphragm element or unit which, in assembly with other like annular diaphragm units, is adapted to constitute one side of a bellows convolution;

Figure 2 is a fragmentary isometric view, partially in section, of an inner connecter ring by which a pair of annular bellows diaphragms are adapted to be connected together;

Figure 3 is a fragmentary isometric view, partially in section, of a section of an outer connecting ring for securing the annular diaphragm units together by pairs alternating with the inner connecting ring shown in Figure 2;

Figures 4, 5, 6 and 7 are similar fragmentary radial sectional views through respective bellows structures showing four different or modified forms of bellows diaphragm units;

Figure 8 is a fragmental diametrical vertical sectional view through a pneumatic vehicle suspension device or "spring," showing one important use of bellows constructed according to the present invention, with the bellows in a normal partially expanded condition;

Figure 9 is a fragmental diametrical vertical sectional view through the vehicle suspension device shown in Figure 8 but revealing the bellows structure fully collapsed in full outline and fully expanded in broken outline;

Figure 10 is a diametrical vertical sectional view through a pressure responsive piston device wherein the bellows structure serves as a high pressure seal for the piston.

Figure 11:
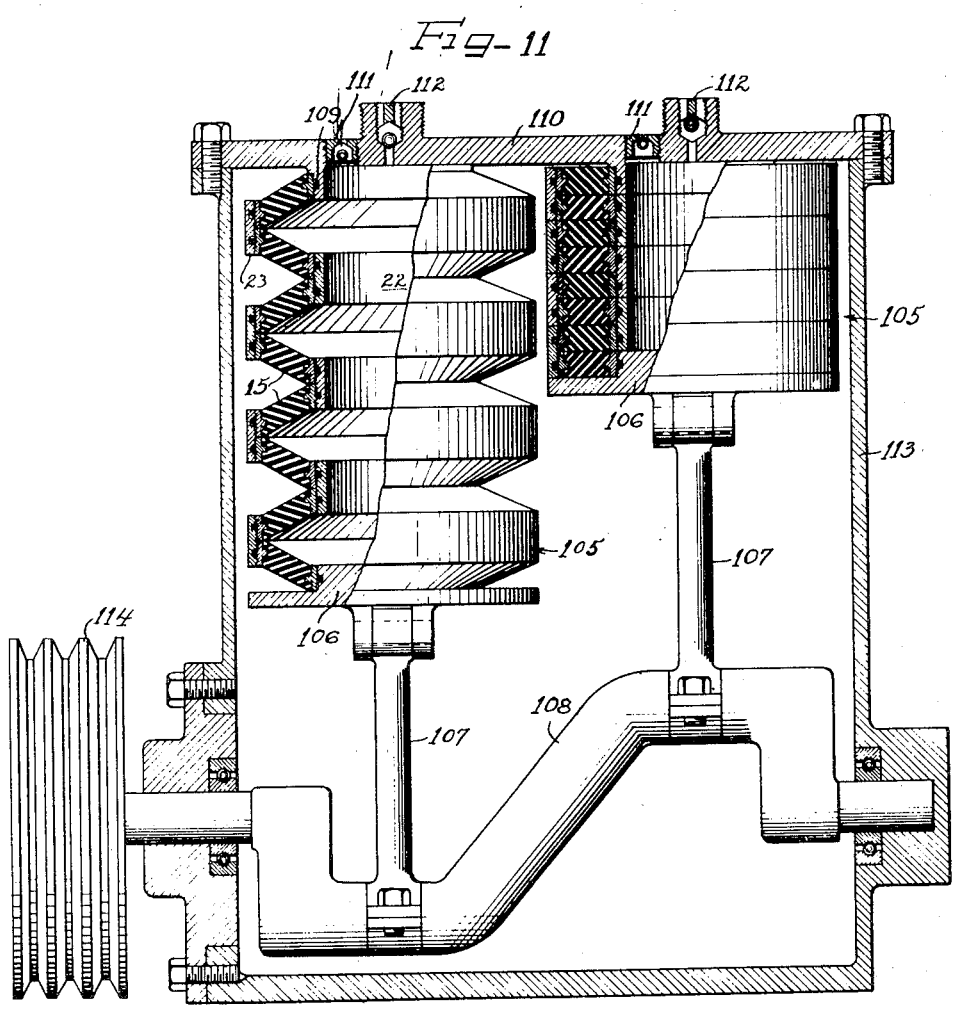
Figure 11 is a vertical sectional view through a simple form of air compressor showing the use of my novel bellows structure in a pump.

An important feature of this invention resides in constructing a bellows from a plurality of standardized annular diaphragm units such as the unit 15 shown in Figure 1. This diaphragm unit 15 comprises a flexible, flattened, elastic body 17 which may be made from any suitable material on the order of rubber or synthetic rubber bounded on its inner periphery by a relatively small diameter mounting ring 18 and on its outer periphery by a larger diameter concentric mounting ring 19. The mounting rings 18 and 19 may be and preferably are formed from suitable metal or hardened plastic and are intimately united with the diaphragm body 17 by vulcanized or chemical bonding, by adhesive or prestressed mechanical adhesion, and the like. In any event, the union between the diaphragm body 17 and the mounting rings 18 and 19 should be such that the mounting rings can be relatively deflected axially to a quite substantial extent to correspondingly deflect and stretch the body 17 without affecting the bond between the rings and body and thus maintain a perfectly fluid tight relationship therebetween in the presence of high fluid pressures. The internal and external diameters as well as the thickness, and other characteristics of the diaphragm unit 15 may be varied within a very substantial range to meet the particular conditions under which the bellows of which it is to form a part is to be used. In this way, various known factors can be anticipated, such as the degree of flexing and maximum stretching which will be required of the bellows, the maximum fluid pressure the bellows must withstand, the frequency of flexing reciprocation, etc.

In assembly, a coaxial series of the diaphragm units 15 is connected together by pairs to provide the convolutions of a bellows. Accordingly, each of the inner mounting rings 18 is internally threaded as at 20 and each of the outer mounting rings 19 is externally threaded as at 21 so as to be threadedly assembled with an externally threaded inner complementary connecting ring 22 and an internally threaded outer complementary connecting ring 23 respectively. For this purpose, the connecting rings 22 and 23 are formed of twice the width of the respective inner and outer mounting rings 18 and 19. Each pair of the diaphragm ring units 15 has the outer mounting rings 19 thereof threaded into one of the outer connecting rings 23, while the contiguous diaphragm units 15 of each pair of diaphragms thus connected is secured threadedly about one of the inner connecting rings 22. By reason of the relatively alternating or staggered relationship thus effected of the inner and outer connecting rings 22 and 23, each of the plurality of diaphragm units 15 assembled together to make up a bellows of the desired length is connected to every other diaphragm unit in convoluted relationship so that the assembly can be axially deflected, stretched or expanded bellows-fashion.

A bellows made up of ring units according to this invention is protectively armored internally and externally by the coaxial inner and outer connecting rings 22 and 23, respectively. Internal or external pressures or forces cannot deform or interfere with operation of the bellows due to the inherent rigidity of the connecting and mounting rings and the major resistive dimension of the diaphragm unit bodies 17.

In order to perfect a fluid tight seal between the mounting rings 18 and 19 and the connecting rings 22 and 23, respectively, thread sealing means may be provided on the connecting rings. This may take the form of a pair of appropriately spaced parallel continuous rings of thread sealing material 24 in the threaded external periphery of each of the inner connecting rings 22, and spaced parallel rings of similar thread sealing material 25 in the threaded internal periphery of each of the outer connecting rings 23. To receive the thread sealing material, the inner connecting rings may be provided with appropriate grooves 27 while the outer connecting rings are provided with grooves 28 for this purpose. The strips or rings of sealing material 24 and 25 are initially disposed to project at least to the crown of the respective threads on the connecting rings so that when the threads 20 and 21 on the mounting rings are threaded therethrough, a thorough fluid seal is provided, and incidentally also a substantial thread lock to hold the respective interconnected rings against unthreading.

Although the diapraghm units 15 are, as described, securely connected together in pressure sealed relation, any individual unit can readily be unscrewed and replaced when necessary substantially without disturbing other diaphragm units in the bellows.

The similar forms of the invention shown in Figures 4, 5, 6 and 7, are essentially the same in that they are all composed of the same basic components and are principally distinguishable by various types of auxiliary bond-enhancing and protective and reinforcing means to meet various conditions in use. The various forms and possible permutations or variants thereof afford an extensive range of deflection and fluid pressure resistance characteristics in the diaphragm ring units, as well as other operational and practical characteristics.

In the form of the invention shown in Figure 4, each of the inner mounting rings 18 is provided with means for increasing the bonding area for the body 17 and also reinforcing the union, such as an integral outer peripheral rib 29 adapted to project radially substantially into the diaphragm body 17. The inner periphery of each of the outer mounting rings 19 is provided with a similar but radially inwardly projecting bonding and reinforcing rib 30. The increased bonding area for the adjacent edges of the diaphragm body 17 and the reinforcement against lateral stresses afforded by the ribs 29 and 30 renders the individual diaphragm units 15 powerfully resistant to shearing and pulling loose of the respective diaphragm bodies 17 under the stretching and deflecting forces to which the diaphragms are subjected when the bellows is expanded even to extreme deflection thereof, as indicated in broken outline in Figure 4.

In the construction shown in Figure 5, the structural details are substantially the same as in the form of Figure 4, except that each inner mounting ring 18a is provided with a radially outwardly projecting integral lip 31 along the edge thereof which is at the side of the diaphragm body 17 toward which the body is deflected. The outer side of the lip 31 is preferably formed flush with the edge of the mounting ring 18a while the inner side may be of a tapered construction substantially as shown in order to afford maximum bonding area for the diaphragm body and at the same time an effective reinforcement to relieve the bonded marginal portion of the diaphragm body from undue deflection stresses in the expansion of the bellows as indicated in broken outline. Each outer mounting ring 19a is provided with a similar bonding and reinforcing lip 32 projecting radially inwardly along the edge thereof on the opposite side of the diaphragm body 17 from the bonding and reinforcing lip 31 on the inner mounting ring but of similar construction and adapted to reinforce and improve the bond of and reinforce the outer margin of the diaphragm body in the deflection thereof. Thus it will be seen that the alternated reinforcing and bonding lips 31 and 32 on each of the diaphragm ring units 15a equally strengthen and reinforce the several assembled diaphragm ring units and render the same capable of exceptionally hard and prolonged usage.

Where exceedingly high fluid pressures are involved in the operation of the bellows, the construction shown in Figure 6 is particularly advantageous since the diaphragm ring units and the bodies 17b thereof are reinforced and protected by relatively more rigid axial side plates 33 which will resist ballooning pressures against the resilient sides of the bodies. In order to accommodate deflection movement of the diaphragm rings 15b, the side reinforcing plates 33 are formed of relatively thin material such as resilient metal so as to be laterally deflectable with the diaphragm ring bodies 17b and conform thereto when the diaphragm units are deflected as indicated in broken outline. Accordingly, each of the reinforcing plates 33 is formed in substantially flat ring shape with inner and outer axially outwardly hook marginal flanges 34 and 35, respectively, adapted to engage with axially inwardly hooked marginal retaining flanges 37 on inner mounting rings 18b and similar marginal retaining flanges 38 on the outer mounting rings 19b. The side plates 33 may be bonded directly to the elastic bodies 17b or loosely assembled therewith. Each of the inner and outer mounting rings 18b and 19b may be provided with bonding and reinforcement ribs 29b and 30b, respectively, cooperating with the interposed diaphragm ring body 17b in the same manner and for the same purpose as the corresponding ribs 29 and 30 of the form of Figure 4. In order to accommodate the additional width at each side of the diaphragm rings 15b as required for the respective retaining flanges 37 and 38, the inner and outer mounting rings 18b and 19b are formed of greater width than in the previously described forms of the invention, and correspondingly wider inner connecting rings 22a and outer connecting rings 23a are provided. Adequate thread seal is afforded for the anticipated increased pressures under which the diaphragms 15b are to be used, by respective double thread seals 24a and 25a on the inner and outer connecting rings, respectively, in association with each diaphragm unit.

Another form of the invention particularly adapted for conditions of use involving unusually high pressures, is shown in Figure 7 wherein each of the diaphragm ring units 15c has the body portion 17c thereof formed of a plurality of alternating concentric rings of elastic material and band type rings of relatively rigid reinforcing material. For this purpose, in the particular embodiment of the invention shown in Figure 7, three concentric elastic body rings 40, 41 and 42 of progressively greater diameter are separated by metal reinforcing rings 43 and 44 which are of appropriate diameter to receive the inner and intermediate elastic body rings 40 and 41. The inner and outer body rings 40 and 41 are secured to inner and outer mounting rings 18c and 19c, respectively. The mounting rings 18c and 19c are threadedly secured to inner connecting rings 22c and 23c respectively. Since the elastic body rings 40, 41 and 42 are, through this construction, of greater width than thickness and bonded or otherwise permanently and quite thoroughly secured not only to the mounting rings but also to the interposed reinforcing rings 43 and 44, they are capable of withstanding great fluid pressure in axial direction both when deflected as indicated in broken outline and when undeflected, and the reinforcing rings 43 and 44 greatly enhance the over all pressure resistance of the diaphgram ring units 15c.

It will be appreciated that in each of the forms of diaphragm ring unit constructions described, the elastic body ring material will be possessed of resilience in accordance with the character of the material selected in any particular instance. In certain practical applications of the invention it may be desired to have a high degree of resilience so that the diaphragm ring units will tend upon deflection to return to undeflected condition with a spring reaction substantially proportionate to the degree of deflection. On the other hand, where the bellows is to serve merely a sealing function, the inherent resilient characteristics of the body ring material may not be of any particular importance and in such instance a material of low resiliency may be selected and in some instance be more desirable. However, in all instances where relatively high fluid pressures are encountered a reasonably high degree of resiliency in the body ring material is desirable because of the greater resistance to ballooning and undesirable pressure stresses as well as improved elasticity and deflection efficiency.

In various practical applications of the diaphragm ring units in bellows structures in use as piston seals, to be hereinafter described, it should be understood, of course, that although the form of Figure 4, that is diaphragm units 15, are shown, any selected one or a combination or variant of the forms of diaphragm ring units hereinbefore described may be optionally utilized, as a matter of preference or in order to meet various requirements in the operating conditions that may be present in various installations.

Having reference now to Figures 8 and 9, the invention is shown as embodied in a pneumatic "spring" structure of the kind more particularly covered in my copending application entitled "Pneumatic suspension for motor vehicles and the like," Serial No. 640,082, filed January 9, 1946, and assigned to the same assignee as the present application. In this device, a flexible bellows 45 made up of coaxially connected diaphragm ring units 15 provides a yieldable seal between a cylinder 47 and a piston 48 reciprocable within the cylinder. The cylinder 47 is of substantially greater diameter than the piston 48, and a completely spaced relationship is maintained at all times between the wall of the cylinder and the piston.

At its base end, the cylinder 47 is adapted to be supported by a vehicle axle or the like and is close fluid tight by a closure plate 49 which is threaded into an internally threaded flange 50 fixedly carried by the cylinder, a fluid tight seal being provided between the edge of the closure plate 49 and the flange 50 by means such as a thread seal 51. In effecting a sealed relationship between the bellows 45 and the opposite end of the cylinder 47 the outer end diaphragm ring unit 15 of the bellows has the outer mounting ring 19 thereof threadedly secured in sealed relation to a laterally projecting attachment flange ring 52. This flange ring is adapted to be engaged between the adjacent end of the cylinder 47 and a cap plate 53 threaded down into an internally threaded securing flange 54 fast upon the cylinder. A fluid seal 55 is provided between the attachment flange ring 52 and the flange 54.

At its opposite end, the bellows 45 is secured to the piston 48 by having the inner mounting ring 18 of the appropriate endmost diaphragm ring unit 15 threaded onto the head of the piston, with a thread seal 57 assuring a fluid tight joint. By preference, a lateral supporting and locking ring flange 58 is threaded onto the piston head and backed against the contiguous mounting ring 18 to lock it against loosening relative to the piston while at the same time affording a reinforcing backing for the endmost diaphragm unit 15 in the reciprocation of the piston.

Extending up through and in spaced relation to the bellows 45 is a hollow cylindrical piston shaft 59 which projects beyond the cylinder 45 through a cylindrical bearing 60 carried by a flange structure 61 threaded into the attaching flange 54. The bearing 60 may be lubricated through a fitting 62, and appropriate packing 63 at the outer end of the bearing 60 resists the escape of lubricant outwardly along the piston shaft. At its outer end the piston shaft 59 carries a cap 64 having an eye 65 by which it may be secured to a vehicle chassis. Thus, the weight of the vehicle chassis will normally tend to telescope the piston 48 within the cylinder 47, and the pneumatic suspension is effected by introducing compressed air into the bottom of the cylinder 47 from a suitable source through a duct 67 to provide an air cushion under the piston 48 tending to protract the latter relative to the cylinder 47. By controlling the air pressure and air volume within the cylinder 47 by the introduction of compressed air through the duct 67 and withdrawal of air through an exhaust duct 68 in such manner as more particularly set forth in my above mentioned copending application, pneumatic suspension of the vehicle is effected. In all relative positions of the cylinder 47 and the piston 48, whether intermediate so that the bellows 45 is partially expanded, or fully retracted so that the bellows unit is fully collapsed as shown in full lines in Figure 9, or, fully telescoped so that the bellows unit is fully expanded as shown in broken outline in Figure 9, a completely fluid tight seal is provided by the bellows 45.

Vibration dampening or shock absorbing is effected in the pneumatic spring device by providing concentrically within the tubular piston shaft 59 a cylindrical chamber 70 formed with a lateral base attachment flange 71 sealingly secured between the lower end of the cylinder 47 and the closure plate 49 enclosed at its upper end by a cap 72 carrying a cylindrical bearing 73 through which a damper rod 74 projects slidably into the cylinder 70. The upper end of the rod 74 is secured axially in the inner face of the cap 64. The lower end of the rod 74 carries a cylindrical head 75 which is of only slightly smaller diameter than the inner diameter of the cylinder 70. A relatively heavy viscous fluid fills the interior of the cylinder 70 and provides a viscous damping film between the wall of the cylinder and the external wall of the damper head 75 which effectively resists relative rapid motion between the damper head and the damper cylinder due to the shear strength of the fluid film. Relatively slow reciprocal motion between the damper head 75 and the damper cylinder 70 is permitted by free flow of the viscous fluid through axially extending openings 77 in the damper head. Bearings 78 maintain a permanently spaced relationship between the outer wall of the damper cylinder 70 and the inner wall of the cylinder piston shaft 59.

In a vehicle suspension device such as just described, it will be appreciated that very great fluid pressures which are often imposed with intense and sudden force must be resisted by the bellows 45. While the associated vehicle is in motion, the bellows will be virtually constantly subjected to flexing action. A bellows constructed according to the present invention is eminently suitable for this purpose. Furthermore with a bellows constructed according to the present invention of a plurality of threadedly assembled diaphragm ring units 15, should a leak develop in any of the diaphragm rings, it can be very readily replaced and thus the remainder of the bellows can be retained in service indefinitely and need not be discarded.

In Figure 10 is shown a device for transmitting power created by fluid pressure. In this device a bellows 80 provides a thorough pressure fluid seal between a cylinder 81 and a piston 82 axially reciprocable in concentric spaced relation therein. By reason of the flexible seal provided by the bellows 80, frictional interengagement between the piston 82 or a sealing structure thereon and the wall of the cylinder 81 is entirely avoided, thus affording a frictionless relationship that eliminates the customary drag between the piston and the cylinder.

Pressure sealed attachment of one end of the bellows 80 to the outer end of the cylinder 81 is effected by clamping a laterally extending attachment ring 83 to which the adjacent endmost diaphragm ring unit 15 is sealingly secured, to the end of the cylinder by means of a securing ring 84 which is threaded into an attachment flange 85. The securing ring 84 may be formed as part of a guide structure for a piston rod 87 and for this purpose has inwardly projecting tubular guide portion 88 extending concentrically through the interior of the bellows 80 and carrying a sleeve bearing 89 at its inner end for guiding the piston rod 87. Projecting outwardly coaxial with the guide 88 is a bearing support extension 90 carrying a cylindrical bearing 91 for the outer end portion of the piston shaft and adapted to be lubricated through a fitting 92. Packing 93 carried by tubular outer extension 94 on a locking head structure 95 surrounds the piston shaft 87 to prevent lubricant from escaping or being carried outwardly by the piston shaft. At its inner end, the bellows 80 is secured to the piston 82 by threading the innermost diaphragm ring unit 15 onto a cylindrical shoulder 96 on the piston, and a thread seal 97 affords a thorough pressure seal.

At its lower end, the cylinder 81 is sealed closed by a closure plate or the like 98 which may be threaded into an internally threaded attachment flange 99 on the end of the cylinder, and a thread seal 100 insures a fluid tight joint. Pressure fluid such as compressed air, or if preferred, hydraulic fluid is introduced into the cylinder 81 in any suitable manner as by a duct 101 secured into an axial opening through the closure plate 98 to direct the pressure fluid against the piston 82 and drive it in opposition to any force tending to retract the piston down into the cylinder, such for example, as the weight of a machine element or other device or member indicated at 102 and secured to the outer end of the piston rod 87. Full force of the pressure fluid, without any leakage or dissipation is effective against the piston 82 since the bellows 80 at all times maintains a perfectly sealed relationship between the piston and the upper end of the cylinder 81. The interior of the bellows 80 may be vented to atmosphere through a vent 103 provided therefor in the superimposed securing ring 84 and locking head 95.

In Figure 11 is disclosed the use of bellows constructed according to the present invention in a compressor unit. In the present instance a pair of compressor bellows 105 is shown. Each bellows 105 is attached at one end to a piston 106 which is adapted to be driven reciprocably through the medium of a connecting rod 107 by a crank shaft 108. At its opposite end each of the bellows units 105 is secured to a respective inwardly projecting annular flange 109 on a head plate 110 which carries a valve controlled intake 111 and a valve controlled outlet 112 for each of the respective compression units. The head plate 110 and the crankshaft 108 are supported in suitable fashion by a framework or housing 113. The crank shaft 108 is adapted to be driven from any suitable source of power as through the medium of a sheave 114. As each of the pistons 106 is alternately retracted in an intake stroke and projected by the operation of the crank shaft 108, air is drawn through the inlet 111 into the chamber provided within the bellows 105, and then expelled through the outlet 112 in the compression stroke of the piston.

It will be observed that by the use in the compressor of bellows units 105 made according to the present invention, a cylinder structure is entirely eliminated since the bellows units themselves serve the functions of the usual cylinder. Accordingly, the compressor is adapted to be made quite compact and to develop a high degree of efficiency since the work exerted by the piston is virtually all utilized in compressing air and frictional losses are reduced to an extreme minimum.

There are, of course, many other uses to which bellows constructed according to the present invention may be effectually put, and the specific illustrated applications of the invention are accordingly to be understood as being merely illustrative of a very few practical ways in which the invention can be utilized.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a bellows construction, a concentric series of diaphragm ring units, each of said ring units comprising an elastic body and spaced concentric mounting rings of relatively rigid material, internal and external connector rings connecting said mounting rings by staggered pairs, whereby upon relative axial separating movement of the connector rings the diaphragm ring units will react bellows fashion with each cooperating pair of diaphragm ring units providing a convolution of the bellows, all of said rings retaining their original diameter upon said axial separation and said elastic bodies yielding by deflection and stretching conformably to the separation of the connector rings, and sealing means between the interfaces of the mounting rings and the connector rings and spaced inwardly from the edges thereof.

2. In combination in a structure including a piston and means cooperating with the piston, said piston and means being relatively reciprocal in operation, a bellows comprising a coaxial series of diaphragm ring units each comprising an elastic body and inner and outer concentric mounting ring elements, connecting ring elements threadedly connecting said mounting ring elements by pairs to unite said diaphragm ring units into bellows convolution relationship, a mounting ring on the endmost diaphragm ring unit at one end of the bellows threadedly secured to the piston, the endmost diaphragm ring unit at the opposite end of the bellows having a lateral attachment flange threadedly secured thereto, said attachment flange being secured to said reciprocably cooperating means.

3. In combination in a bellows construction, a plurality of coaxial diaphragm ring units each of which comprises a body portion of elastic material highly resistant to fluid pressures and concentric edgings of relatively rigid material, means for securing said edgings together by pairs to provide the bellows convolutions, and concentric face-opposing plate means movable relative to said edgings for protecting said body portions against undue deflection stresses.

4. In combination in a bellows construction, a plurality of coaxial diaphragm ring units each of which comprises a body portion of elastic material highly resistant to fluid pressures and concentric edgings of relatively rigid material, means for securing said edgings together by pairs to provide the bellows convolutions, and concentrically arranged face-opposing plate means for protecting said body portions against high fluid pressures, the edgings of the ring units having means thereon for retaining said plate means in position.

5. In a diaphragm structure, a diaphragm ring unit comprising a body of elastic material, and concentric mounting rings secured on the respective inner and outer edges of said body, and means overlying an outer face of the body for reinforcing the body upon relative flexure of the body in response to relative axial deflection of the mounting rings.

6. In combination in a diaphragm structure, a diaphragm ring unit comprising a body of elastic material, metallic inner and outer edgings on said body, and additional metallic reinforcing means formed separately and movable relative to said edgings and cooperating with an outer face of said body and extending between said edgings to enhance the pressure resistance of the body.

7. In a high pressure diaphragm structure, a diaphragm ring unit comprising a body of elastic material, edgings of relatively rigid material for said body, reinforcing ring elements separate from said edgings and having flat faces lying against the sides of and cooperating with said body to enhance its pressure resistance, and means on said edgings retainingly cooperating with said reinforcing ring elements.

8. In combination in a diaphragm ring unit for a high pressure bellows, a body of yieldable material, mounting ring elements cooperating with the edges of said body and axially separable to deflect said body, and flexible reinforcing ring plates cooperating with the side faces of the body and deflectable therewith in the relative axial separating movements of said edge elements.

9. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; and internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings.

10. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings; and a radially extending ring flange member threadedly connected to the free mounting ring of the endmost diaphragm ring unit at one end of the bellows assembly and adapted to be clamped into a structure with which the bellows assembly may be associated.

11. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; and internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings; said mounting rings including means for increasing the bond areas thereof in engagement with the elastic body.

12. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; and internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings; said mounting rings being of generally angular cross-section and each having a tapered marginal flange partially overlying a face of the associated elastic body.

13. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings; and broad-faced ring elements coacting with at least a face of the elastic bodies for protecting the bodies against excessive pressures.

14. In combination in a bellows assembly; a concentric series of diaphragm ring units; each of said ring units comprising a thick elastic body resiliently yieldable both axially and radially, and spaced concentric inner and outer mounting rings of substantially rigid material having broad radially facing surface areas to which wide respective inner and outer radial edges of the elastic body are continuously annularly bonded throughout a substantial extent in width in direct face-to-face intimate fluid-tight relation; said mounting rings being threaded on the respective surfaces thereof facing away from the respective elastic bodies to which they are bonded; internal and external threaded connector rings threadedly connecting said mounting rings by pairs to form said series of diaphragm ring units into a bellows; whereby upon relative axial separating movement of the connector rings the diaphragm ring units will react bellows fashion with all of said mounting and connector rings retaining their original diameter and said elastic bodies yielding axially and radially by deflection and stretching conformably to the separation of the connector rings; each of said elastic bodies comprising a plurality of elastic rings; and reinforcing rings between and bonded to said elastic rings.

15. In combination in a diaphragm unit, a body ring of elastic material, inner and outer concentric edging rings of relatively rigid material, and a ring-shaped protective plate overlying a face of the body ring, said plate having outwardly extending angular marginal flanges, and said edging rings having marginal flanges extending into overlying relation to said plate flange.

16. In combination in a diaphragm ring unit, a body ring of elastic material, inner and outer concentric edging rings of relatively rigid material bonded to the body ring of elastic material, said edging rings being of generally channel-shape cross-section and having respective spaced flanges overlying the margins of the body ring, and protective plates lying in opposition to the axially facing surfaces of the body ring and having the margins thereof extending into the channels provided by the edging rings.

GERVASE M. MAGRUM.

REFERENCES CITED

The following references are of record in the file of this patent:

UNITED STATES PATENTS

| Number | Name | Date |
| --- | --- | --- |
| 320,738 | Wolfe | June 23, 1885 |
| 521,465 | Gage | June 19, 1894 |
| 879,127 | Beler | Feb. 11, 1908 |
| 1,180,947 | Scott | Apr. 25, 1916 |
| 1,526,015 | Sanner | Feb. 10, 1925 |
| 1,668,669 | Cadwell | May 8, 1928 |
| 1,885,457 | Lord | Nov. 1, 1932 |
| 1,902,323 | Monge | Mar. 21, 1933 |
| 2,089,471 | Geyer | Aug. 10, 1937 |
| 2,100,642 | Wellman | Nov. 30, 1937 |
| 2,135,617 | Geyer | Nov. 8, 1938 |
| 2,200,305 | Lauzedde | May 14, 1940 |
| 2,275,712 | Zand | Mar. 10, 1942 |
| 2,324,173 | Porter | July 13, 1943 |
| 2,335,276 | Heintz | Nov. 30, 1943 |
| 2,341,525 | Boynton | Feb. 15, 1944 |
| 2,341,556 | Joy | Feb. 15, 1944 |
| 2,368,132 | French | Jan. 30, 1945 |
| 2,376,475 | Bush | May 22, 1945 |
| 2,411,748 | Kelly | Nov. 26, 1946 |